June 4, 1957   W. F. HOSFORD ET AL   2,794,459
JIG SAW BLOWER
Filed Jan. 11, 1955   2 Sheets-Sheet 1
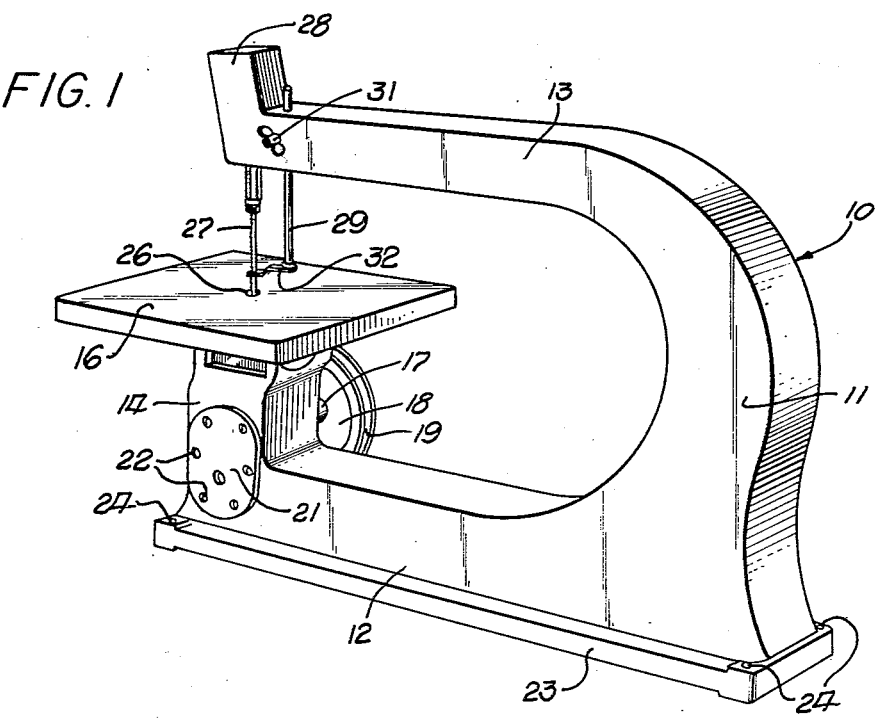
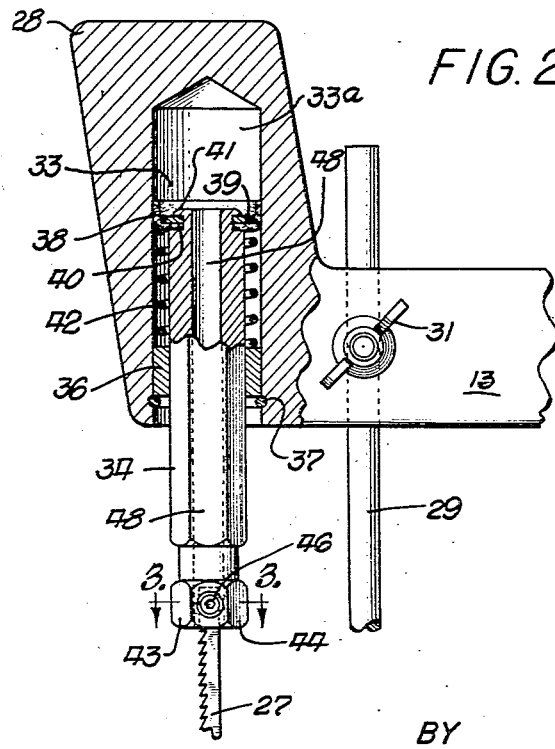
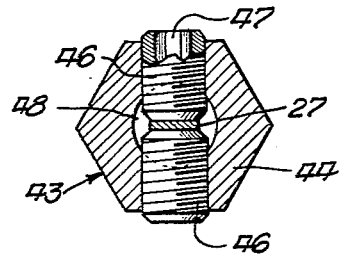
INVENTORS
WILLIAM F. HOSFORD
CLARENCE C. WIESER
BY
ATTORNEY June 4, 1957   W. F. HOSFORD ET AL   2,794,459
JIG SAW BLOWER
Filed Jan. 11, 1955   2 Sheets-Sheet 2
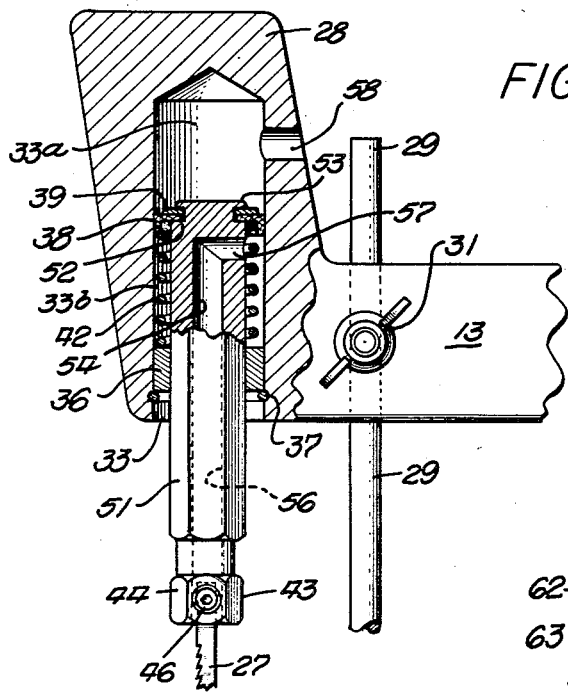
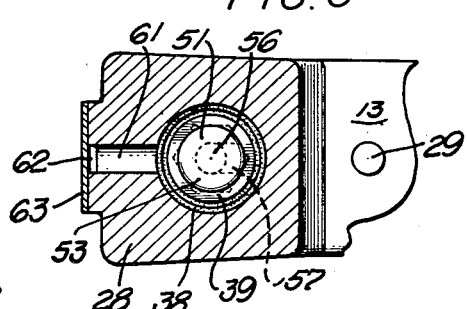
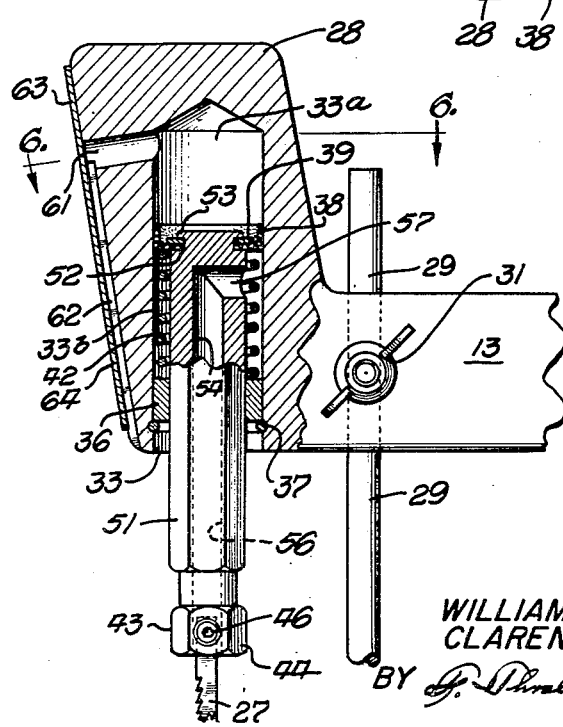
INVENTORS
WILLIAM F. HOSFORD
CLARENCE C. WIESER
BY
ATTORNEY United States Patent Office 2,794,459
Patented June 4, 1957

2,794,459

JIG SAW BLOWER

William F. Hosford and Clarence C. Wieser, Chicago, Ill., assignors to Duro Metal Products Co., Chicago, Ill., a corporation of Illinois Application January 11, 1955, Serial No. 481,244

1 Claim. (Cl. 143—157)

This invention relates to jig saw blowers, and more particularly to an improved blower device for jig saws in which the blower mechanism is incorporated in and made a part of the jig saw structure.

It is a general object of the invention to provide a jig saw blower built into the jig saw structure and from which an air stream is directed onto the jig saw worktable in the vicinity of the saw blade for the purpose of removing sawdust that accumulates as the saw cuts, thereby to provide an area of clear visibility on the workpiece being cut.

Another object of the invention is the provision of a blower device for jig saws which is simple and inexpensive, and which utilizes in the blower mechanism parts which are otherwise necessary in the jig saw structure.

It is a further object of the invention to provide a jig saw blower which is of improved efficiency as a result of the travel of the air stream downwardly along the saw blade and onto the worktable at the exact spot of the cut being made, thereby giving a large sawdust-free area for better visibility.

It is also an object of the invention to provide a jig saw blower which is effective and which eliminates interference with the cutting operation previously encountered from a downwardly-extending blower tube or hose in the vicinity of the piece being worked upon.

A further object of the invention is the provision of a double action jig saw blower which supplies a practically steady flow of air into the vicinity of the saw blade for the removal of accumulating sawdust.

Other objects and advantages of the invention will be apparent from the following description and the accompanying drawings in which similar characters of reference indicate similar parts throughout the several views.

Referring to the two sheets of drawings:

Fig. 1 is a perspective view of a jig saw incorporating a blower which embodies our invention;

Fig. 2 is a fragmentary, side view, partly in section, of a portion of the jig saw illustrated in Fig. 1, the view showing in detail a preferred form of our improved blower;

Fig. 3 is an enlarged sectional view, taken substantially on a line 3—3 of Fig. 2, in the direction of the arrows, the view illustrating the relationship of elements of a blade-retaining chuck as utilized with our jig saw blower;

Fig. 4 is a fragmentary side view, partly in section and similar to that of Fig. 2, and illustrates a modified form of jig saw blower embodying our invention;

Fig. 5 is a fragmentary, side elevational view, partly in section, illustrating another modified form of our invention in which an auxiliary air channel is incorporated in the jig saw housing; and Fig. 6 is a fragmentary sectional view taken substantially on a line 6—6 of Fig. 5, in the direction of the arrows, the view showing details of the auxiliary air channel utilized in this embodiment.

Having reference to the accompanying drawings, wherein exemplary embodiments of our invention are disclosed for illustrative purposes, and referring particularly to Fig. 1, it may be observed that a jig saw 10 utilizing our blower comprises a C-shaped box-type frame 11 having a lower horizontal base frame portion 12 and an upper horizontal frame arm portion 13. The horizontal base frame is of standard design in that it includes a crankcase 14 supporting thereon a worktable 16. The crankcase contains various component parts of the jig saw such as a lower vertical shaft which includes a blade-retaining chuck on its upper end, the shaft being actuated by a cam (not shown) which, in turn, is driven by a pulley spindle 17 and an affixed pulley 18. The pulley 18 is connectable to a conventional power source such as an electric motor by a drive belt received in groove 19 of the pulley. A crankcase cover 21, giving access to the interior of the crankcase, is secured to the crankcase by removable fastening means such as screws 22. The base frame 12 includes a base flange 23 which defines therein openings 24 suitable for use in mounting the jig saw on a table or other supporting structure. The worktable 16 defines a central aperture or slot 26 adapted to receive a saw blade 27 secured to the blade-retaining chuck of the lower shaft and extending vertically through the worktable.

The upper horizontal frame arm 13 terminates in an enlarged head portion 28 which is located approximately over the central area of the worktable. The jig saw has adjacent to the head portion 28 a vertical work retainer guide shaft 29 extending through suitable openings in the frame arm and held in place by an adjusting screw 31. The guide shaft includes a work retaining foot 32 affixed to the lower end of the shaft 29 and extending into the proximity of the saw blade 27 for the dual purpose of backing up or supporting the saw blade and of holding down the piece being worked upon. The shaft 29 may, of course, be adjusted vertically.

The enlarged head portion 28 of the horizontal frame arm has therein a vertical cylinder bore 33 positioned over the aperture 26 of the worktable. As is shown in detail in Fig. 2, an upper shaft 34 extends into the cylinder bore 33 and is adapted for reciprocating movement therein. The shaft 34 is suitably held within the cylinder bore by a shaft guide bushing 36 which, in turn, is maintained within the lower portion of the bore by a retaining ring 37.

Around the shaft 34 and adjacent to the upper end thereof is an air-seal gasket such as that provided by a flexible leather cup washer 38. The leather gasket is secured by a steel retaining washer 39, the gasket and washer being seated on a shoulder 40 provided on the upper end portion of the shaft and held in place by a rolled or riveted flange 41 on the upper end of the shaft. The outer peripheral surface of the leather gasket 38 is in contact with the wall of the cylinder bore 33 so as to prevent the passage of air around the outside of the shaft 34. As shown in Fig. 2, the outer portion of the leather gasket is bent upwardly along the wall of the chamber 33, so that movement of the shaft 34 upwardly and into the bore will cause the peripheral surface of the leather gasket to be forced tightly against the chamber wall thereby insuring air pumping action.

Resilient means, such as a compression springs 42, is preferably utilized with the shaft 34 to assist the reciprocating movement of the shaft within the chamber 33. The compression spring 42 surrounds the shaft with the upper end of the spring bearing against the lower radially disposed surface of the leather gasket 38, and the lower end of the spring bears against the inner end of the shaft guide bushing 36. On the lower end of the shaft 34 is a blade-retaining chuck 43 adapted to receive and hold the upper end of the saw blade 27. As shown in detail in Fig. 3, the blade-retaining chuck comprises a chuck housing 44 which, in effect, is an extension of the shaft 34. Socket type set screws 46 are threaded in aligned cross bores on opposite sides of the chuck housing. The set screws are moved inwardly to engage and grip the saw blade 27 between their inner ends. Tightening of one or both of the set screws causes the saw blade to be held firmly and securely relative to the upper shaft 34.

The upper shaft 34 has therein an air passage 48 which extends lengthwise of the shaft from the chuck 43 to that portion of cylinder bore 33 which is above the airseal gasket 38, such portion being designated herein as 33a. The air channel 48 is of sufficient diameter to cause air forced from the portion 33a of the cylinder bore to be directed downwardly through the shaft and toward the worktable 16 at a velocity adequate to carry away particles of sawdust that tend to accumulate in the proximity of aperture 26 of the worktable. Such passage of air from the upper portion 33a of the cylinder bore through the air channel 48 results from the upward stroke of the shaft 34 into the cylinder bore during its reciprocating movement which is effected by forces transmitted through the saw blade and the aid of the spring 42. As this occurs, air from the cylinder bore flows downwardly through the air channel 48, as described.

Restriction of the air channel 48 by the set screws passing through the axial passage in the blade-retaining chuck 43 on the lower end of the shaft increases the velocity of the air stream as it leaves the air channel. Such increased velocity augments the effectiveness of the air stream as it passes downwardly along the saw blade and toward the workpiece being cut by the saw blade 27. The passage of air forced from the upper portion 33a of the cylinder bore removes not only particles of sawdust accumulating on either the workpiece or the worktable but also sawdust being carried on the saw blade itself. The direction of the air stream from the air passage 48 is such that a large sawdust-free area is obtained at the position of the cut being made, thereby affording visibility to the jig saw operator.

In the operation of a jig saw embodying our improved blower, the upper shaft 34 is pulled downwardly by the saw blade 27 which constitutes a link between the shaft and the various operating elements of the jig saw contained in the crankcase 14. As the shaft 34 moves downwardly, spring 42 is compressed while air enters into upport portion 33a of the cylinder bore through air channel 48. Upon completing its downward stroke, the shaft 34 moves upwardly as a result of the force exerted by the spring 42 and by the saw blade 27, the force of the spring 42 being such that it keeps the blade taut and relieves the blade of compressive stress. Movement of the shaft upwardly tends to compress the air in portion 33a of the cylinder bore thereby forcing the air through the air channel 48 downwardly along the saw blade and toward the worktable 16. This downward passage of the air through the air channel 48 occurs with each upward stroke of the shaft, and because of the rapidity of the stroke cycles there is, in effect, a practically continuous, but pulsating, air stream removing sawdust from the area surrounding the saw blade.

A modified form of our blower is shown in Fig. 4, in which head portion 28 of the upper horizontal frame arm 13 has therein a vertical cylinder bore 33 similar to that utilized in the described embodiment of the invention. An upper shaft 51 is mounted for reciprocating movement within the bore 33 by a shaft guide bushing 36 which is maintained within the lower portion of the chamber by a retaining ring 37. A flexible leather gasket 38 and a steel retaining washer 39 are held in place against a shoulder 52 on the shaft 51 by a flange 53 conveniently formed by the rolling or riveting of the upper end of the shaft. Resilient means, such as compression spring 42, is provided around the shaft with the upper and lower ends of the spring bearing against the lower radial surface of the leather gasket 38 and the inner end of the shaft guide bushing 36, respectively. The lower end of the shaft 51 includes a blade-retaining chuck 43 utilizing set screws 46, as illustrated in Fig. 3, to secure saw blade 27 to the shaft. To direct the flow of air from the cylinder bore downwardly toward the worktable 16, an air passage 54 is provided in the shaft 51. The air passage 54 comprises a vertical portion 56 which extends from the blade-retaining chuck upwardly through the length of the shaft to a point below the leather gasket 38, where it adjoins a horizontal or lateral passage 57 opening into the cylinder bore 33. The air passage 54 thus provides for the passage of air from that portion of the cylinder bore 33 below the leather gasket 38, such portion being designated herein as 33b, downwardly through the shaft and toward the worktable.

In this embodiment of our jig saw blower, the outer portion of the leather gasket 38 is bent downwardly along the wall of the cylinder bore 33, so that when the shaft 51 moves downwardly the edge of the gasket is urged tightly against the cylinder bore wall to prevent escape of air from around the end of the shaft. The downward stroke of the shaft 51 forces air from the portion 33b of the cylinder bore through the air passages 57 and 54 and downwardly toward the worktable. To minimize any tendency of the downward movement of the shaft 51 to create a vacuum in the upper portion 33a of the cylinder bore, a lateral opening 58 is provided in the head portion 28 of the frame arm to give free passage of air to and from that upper portion 33a of the bore. The opening 58 extends from the wall of the cylinder bore outwardly to the exterior surface of the head portion and is of sufficient size to eliminate any "drag" on the downward movement of the shaft 51.

In the operation of this form of our invention, the shaft 51 is pulled downwardly by the saw blade 27 thereby forcing the air from lower portion 33b of the cylinder bore and into air passage 54 and downwardly along the saw blade and toward the worktable. Air enters portion 33a of the cylinder bore through the opening 58 as the shaft moves down. The downward movement of the shaft compresses the spring 42, so that upon completion of its downward stroke, the shaft moves upwardly as a result of the force exerted by the spring 42 and by the saw blade 27, the spring exerting force to keep the saw blade taut. Air contained in the upper portion 33a of the cylinder bore escapes through opening 58. As in the previous embodiment, the stroke cycles of the shaft are so rapid that the air forced downwardly through air passage 54 will be effectively and practically continuous and of sufficient velocity to clear away sawdust accumulating on the worktable at the position of the cutting.

An additional modified form of our jig saw blower is shown in Figs. 5 and 6, in which the head portion 28 of the upper horizontal frame arm 13 is provided with the vertical cylinder bore 33 and the shaft 51 extends into the cylinder bore and has therein air passage 54 which includes the vertical portion 56 and horizontal or lateral portion 57. On the lower end of the shaft the blade-retaining chuck 43 includes a chuck housing 44 and set screws 46 for holding the saw blade 27. The shaft is supported for linear movement within the cylinder bore by a shaft guide bushing 36 maintained in place by retaining ring 37. A flexible leather gasket 38 and a steel retaining washer 39 are held against a shoulder 52 on the inner end of the shaft by riveted flange 53. In this embodiment, however, the outer portion of the leather gasket 38 is bent upwardly along the wall of the bore 33 to insure against the escape of air around the shaft as the latter moves into the bore. Resilient means, such as compression spring 42, is interposed around the shaft between the shaft guide bushing and the radial portion of the leather gasket.

The upper portion of the cylinder bore is provided with an opening 61 which extends laterally from the cylinder wall outwardly to an exterior surface of the head portion 28. The head portion 28 also has in the external surface thereof a groove 62 extending from the opening 61 downwardly to the bottom of the head portion and toward the saw blade 27. A cover plate 63 is adhered to the exterior surface of the head portion 28, so as to cover the opening 61 and the groove 62, as shown in Figs. 5 and 6. The groove 62 and the opening 61 constitute an auxiliary air passage 64 for the movement of air from the upper portion 33a of the cylinder bore downwardly toward the saw blade 27.

In the operation of our blower of the type illustrated in Figs. 5 and 6, the shaft 51 is pulled downwardly by the saw blade 27 so that air contained in the lower portion 33b of the cylinder bore is forced through air passage 54 and downwardly along the saw blade 27. As this occurs, spring 42 is compressed, while air is supplied to the upper portion 33a of the cylinder bore through the auxiliary air passage 64, thereby eliminating vacuum "drag" on the downward stroke of the shaft. Upon completion of the downward stroke of the shaft, the force exerted by the spring 42 and the saw blade 27 causes the shaft to move upwardly into the cylinder bore. Such movement causes air from the upper portion 33a of the cylinder bore to flow into auxiliary air passage 64 and downwardly toward the saw blade. As the shaft moves upwardly, air is supplied to the lower portion 33b of the cylinder bore through the air channel 54.

With this construction, a stream of air is being directed against the saw blade and toward the worktable on both the upward and the downward strokes of the shaft 51. This double action of our blower insures that an adequate sawdust-free area is provided at the position of cutting and affords visibility of the workpiece for the operator.

It is understood that within the meaning and purpose of this application, the term "jig saw" is used in a general sense, and includes such comparable devices as scroll saws and the like.

While we have illustrated a preferred embodiment of our invention, many modifications may be made without departing from the spirit of the invention, and we do not wish to be limited to the precise details of construction set forth, but desire to avail ourselves of all changes within the scope of the appended claims.

Having thus described our invention, what we claim as new and desire to secure by Letters Patent of the United States is:

A blower device for use with a jig saw having a frame supporting worktable with a suitable aperture therein for the vertical passage therethrough of a saw blade, said blower device comprising a head portion of said frame having therein a cylinder bore extending vertically above the aperture of said worktable, said head portion further having therein an opening extending from the upper portion of said cylinder bore outwardly to the exterior of said head portion, said head portion further having a groove in its exterior surface extending from said opening downwardly to the bottom of said head portion, a cover plate secured to the exterior surface of said head portion and covering said groove so as to provide an auxiliary air passage, a shaft extending into said cylinder bore and supported for vertical reciprocating movement therein, a flexible air-seal gasket secured to the inner end portion of said shaft with the outer peripheral portion of said gasket in contact with the wall of said cylinder bore, a blade-retaining chuck on said shaft at its lower end, said shaft defining therein an air passage extending from the lower end thereof upwardly through said shaft and into said cylinder bore below said gasket, said shaft and gasket, by movement downwardly in said cylinder bore, forcing air from said cylinder bore below said gasket and into said air passage and by movement upwardly to force air from said cylinder bore above said gasket and into said auxiliary air passage, and said air passage and auxiliary air passage both being disposed to direct the air forced from said cylinder bore toward said worktable in the vicinity of said aperture.

References Cited in the file of this patent

UNITED STATES PATENTS

| | | |
|---|---|---|
| 1,852,193 | Schneider | Apr. 5, 1932 |
| 2,033,846 | Mitchell | Mar. 10, 1936 |
| 2,285,713 | Hedgpeth | June 9, 1942 |
| 2,619,996 | Hullfish | Dec. 2, 1952 |